July 2, 1963

G. RÖHL 3,095,631

STRIPPING DEVICE FOR BOBBINS

Filed July 12, 1960

',

United States Patent Office 3,095,631
Patented July 2, 1963

3,095,631
STRIPPING DEVICE FOR BOBBINS
Georg Röhl, 1 Haidschlagweg, Regensburg,
Bavaria, Germany
Filed July 12, 1960, Ser. No. 42,407
Claims priority, application Germany July 30, 1959
7 Claims. (Cl. 28—20)

In my United States Letters Patent No. 2,941,278, I have described and claimed a stripping device for bobbins especially for the weft bobbins of looms, having jaws movable along the axis of the bobbins, characterised in that the stripping members or jaws are carried by endless pull means which may consist of endless chains. In the construction described in said patent the strippers are directly fixed on the chain and the chain is entirely unprotected. Thus the threads of the remaining filling may entangle with the chains and block them.

The object of the present invention is to cover the roller chains on their working surface with a layer thus preventing the threads from becoming entangled with the roller chains.

According to the present invention there is provided an improvement in or modification of the stripping device set forth in United States Letters Patent No. 2,941,278, characterised by the fact that each endless roller chain is covered on its outer circumference with an endless band of flexible construction material, especially plastic material, from which the stripper projects. Said band may be provided on the side facing the chain with projections integral with the band by means of which it is driven by the chain. The strippers are adapted to be connected integrally with the band and to project to the working side, or they may be fastened on the chain and may project through recesses in the band.

In order to use the stripping device for bobbins of any diameter both endless pull means with the guide members and their supports are adjustable in the chain plane for changing the distance between both parts of the chain facing one another, especially turnable around the lower chain wheel and adapted to be fixed in any adjusted position, so that both chain arrangements are adapted to be moved relatively against one another and fixed in any adjusted position. The whole unit consisting of the upper guide rollers, the guide members and their supports are turnable around the shaft of the lower chain wheel and adapted to be fixed in the casing. Thus the guide members may be adjusted not only to the adjustment of the pull means in respect of the angle of cone of the bobbin, but also to any diameter of the bobbin, so that in any case an exact adjustment to the diameter and shape of the bobbin is possible.

The invention is illustrated by way of example in the accompanying drawings, wherein.

Figure 1:
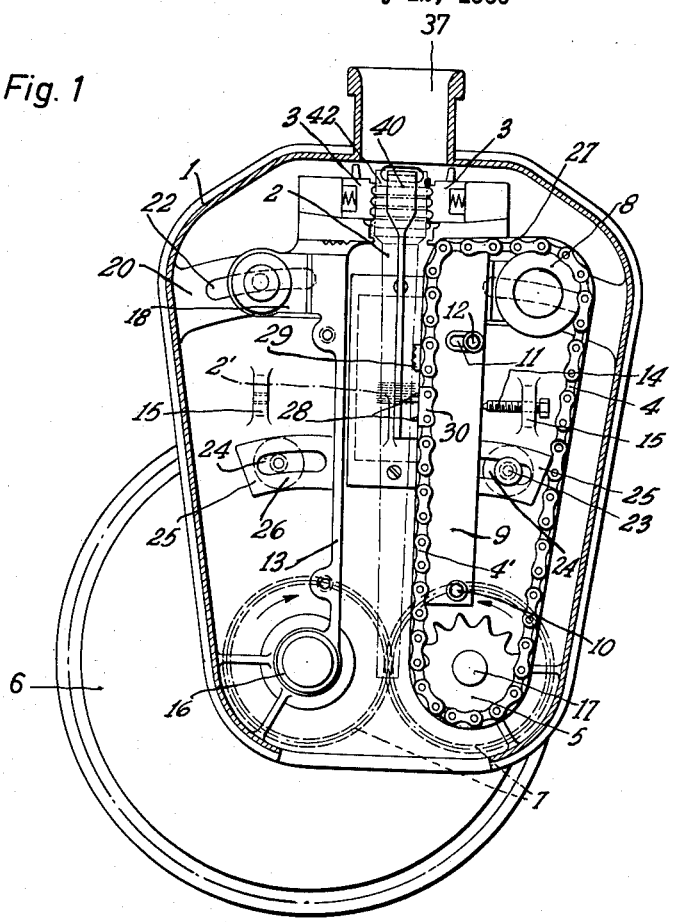
FIGURE 1 is a front view of the stripping device with the protecting casing removed, the endless chain and the adjustable guide member being omitted on the left hand side.
Figure 2:
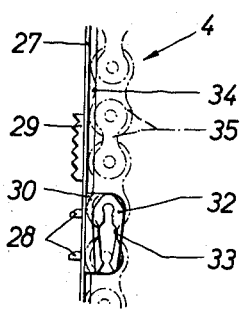
FIGURE 2 shows at an enlarged scale a part of the endless chain with the stripping device.

In the casing 1 of the stripping device diametrically with respect to a bobbin 2 hanging perpendicularly downward between spring-guided cheeks 3 two endless pull means preferably consisting of roller chains 5 are arranged, the facing parts 4' of which extend almost over the whole length of the conical part of the bobbin 2. The chains are driven at their lower part by chain wheels 5 of the same size which are driven from behind over a pulley 6 and gear wheels 7 of equal size in opposite directions, causing the facing parts 4' to be moved with the same speed in the downward direction along the surface of the bobbin 2. The chains 4 run in the upper part over guide rollers 8 and along the bobbin on guide members of the shape of narrow flat guide rails 9 extending almost over the whole length of the conical part of the bobbin 2. The guide rails 9 are pivotally mounted in their lower part around a pivot pin 10, and displaceable and adjustable in their upper part by means of a bolt 12 guided through an oblong hole 11 transverse to the bobbin 2 on a support 13. The guide rails 9 are adapted to be fixed in the inclined position relative to the angle of cone of the bobbin 2 by an adjusting screw 14 screwed through a bracket 15 mounted on the back wall of the casing.

The support 13 carrying the guide rail 9 is pivotally mounted with an eye 16 around the shaft 17 of the driving chain wheel 5, and is provided in its upper part with a lateral boss 18 carrying the rotating guide roller 8. The boss 18, which has a plain under-surface 19 is supported against a bearing 20 with a plain upper-surface facing the under-surface 19 of the casing 1, and is adapted to be displaced on said bearing 20 with a pin 21 projecting from the under-surface 19 of the boss 18 along a circular recess 22. Thus the whole unit consisting of the support 13 and the boss 18 is pivotally arranged around the shaft 17 so that the distance between the facing parts 4' of the chains 4 can be adapted to any diameter of the bobbin 2 in use. The unit 18 is fixed by an adjusting screw 23 guided through an oblong hole 24 of a projection 25 of the support 13 and adapted to be screwed into a screw hole of a boss 26 fixed at the back wall of the casing.

Figure 3:
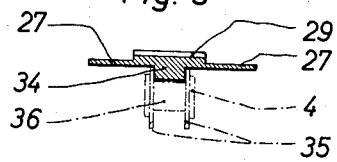
FIGURE 3 is a cross-section through the chain at the height of the post-stripper.
Figure 4:
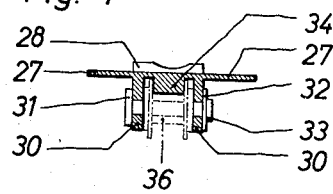
FIGURE 4 is a cross-section through the endless chain at the height of the pre-stripper.

The outer circumference of each chain 4 is covered by a plastic band 27 which is supported against the outer circumference of the chain 4 and is carried by it. The band 27 is of such a width that it projects on either side of the chain as shown in FIGURES 3 and 4.

The remaining filling 2' is stripped from the bobbin 2 by means of a pre-stripper 28 and a post-stripper 29 integral with the band 27. The pre-stripper 28 is connected with the chain by lapping members 30 projecting from the back of the band behind the pre-stripper, spaced in such a manner that the chain 4 fits between them. These lapping members 30 are provided with holes at a distance of two adjacent connecting pins of one chain link through which a locking member 31 already known is pushed which is locked at the other side by locking means 32 and 33. Thus the band 27 is hinged with the chain within the region of the pre-stripper. The post-stripper 29 is not connected with the chain. Instead of connecting the strippers 28 and 29 integrally with the band 27 they may also be fixed directly on the chain 4 and project through recesses in the band 27.

The band 27 is provided in the middle of its side facing the chain 4 with a projecting bead 34 of such a size that it fits between the lateral connecting members 35 of the chain 4 and supports against the rollers 36. Thus the band 27 is safely guided on the chain 4.

The bobbin 2 is transferred on the way from the shuttle to the stripping device into the vertical position on a guide not shown in the drawings. It falls in a vertical position into the reception slot 37 of the stripping device and is caught at its thickened foot 42 between two rails. It is then displaced into the stripping position between the two facing parts 4' of the chain 4 by a bell crank lever 40 swung by a stop fixed on the one chain in counter clockwise direction in FIGURE 5 against the action of a spring. The lever 40 is pivotally mounted on the back wall of the casing.

The remaining filling 2' stripped down by the pre-stripper 28 and post-stripper 29 over the tapered end of the bobbin 2 cannot become entangled with the chain 4 as the latter is protected by the band 27, and falls into a container placed in readiness. The band 27 laterally projecting over the chain 4 prevents the chain from making contact with the thread, dust and accumulation from the working side. The purpose of providing a post-stripper is to achieve a thorough stripping of the bobbin in case the filling is not entirely stripped off by the pre-stripper.

What I claim is:

1. In a stripping device for removing yarn from a bobbin and having means for supporting a bobbin from which yarn is to be removed, a pair of endless flexible members, means guiding said endless flexible members for movement of the latter along paths having runs extending along the axis of a bobbin carried by said supporting means and being disposed at opposite sides of the bobbin, and stripping elements carried by said endless flexible members to axially remove yarn from a bobbin carried by said supporting means during movement of said stripping elements along said runs; each of said endless flexible members including an endless chain of pivotally connected links and an endless flexible band extending along the outer periphery of said chain and drivingly connected with the latter, said band projecting laterally beyond the related chain to avoid entanglement of the removed yarn in said chain, and said means guiding each of the endless flexible members including a driving sprocket in meshing engagement with said chain of the related endless flexible member and being mechanically connected with the driving sprocket of the means guiding the other of said endless flexible members so that the movements of said endless flexible members are synchronized to ensure the simultaneous action of said stripping elements against the yarn on a bobbin carried by said supporting means.

2. A stripping device as in claim 1; wherein said stripping elements are integral with said flexible bands and project from the latter.

3. A stripping device as in claim 1; wherein each of said flexible bands has projections extending from the surface thereof facing toward the related chain and engaging the latter to transmit driving forces from the chain to the band.

4. A stripping device as in claim 3; wherein said projections include spaced apart, apertured ears extending from said band and receiving the related chain therebetween; and further comprising means extending through said apertured ears to lock said band to the related chain.

5. A stripping device as in claim 3; wherein said projections include lugs extending from said bands into the links of the related chain.

6. A stripping device as in claim 1; wherein said stripping elements are fixed to said chain of the related endless flexible member, and said flexible band has openings therein through which said stripping elements project.

7. A stripping device as in claim 1; wherein said means guiding each of the endless flexible members further includes a guide rail extending upwardly from said driving sprocket and a guide roller disposed outwardly with respect to the upper end of said guide rail; and further comprising a mounting member carrying said guide rail and guide roller and being adjustably swingable about the axis of the related driving sprocket for varying the distance between said runs of the endless flexible members.

References Cited in the file of this patent

UNITED STATES PATENTS

| | | |
|---|---|---|
| 2,914,835 | Slayter et al. | Dec. 1, 1959 |
| 2,941,278 | Rohl | June 21, 1960 |

FOREIGN PATENTS

| | | |
|---|---|---|
| 335,166 | Germany | Mar. 29, 1921 |